United States Patent [19]
Heinzman et al.

[11] Patent Number: 5,565,556
[45] Date of Patent: Oct. 15, 1996

[54] C6/C2-C3 OXIDIZED STARCH AS DETERGENT INGREDIENTS

[75] Inventors: Stephen W. Heinzman, Cincinnati; Jeffrey S. Dupont, Fairfield, both of Ohio

[73] Assignee: The Procter & Gamble Company, Cincinnati, Ohio

[21] Appl. No.: 341,332

[22] Filed: Nov. 16, 1994

Related U.S. Application Data

[60] Continuation of Ser. No. 68,452, May 28, 1993, abandoned, which is a division of Ser. No. 791,839, Nov. 14, 1991, abandoned.

[51] Int. Cl.[6] ................................................. C08B 31/18
[52] U.S. Cl. ............................................ 536/105; 536/124
[58] Field of Search ...................................... 536/105, 124

[56] References Cited

U.S. PATENT DOCUMENTS

| | | | |
|---|---|---|---|
| 2,472,590 | 6/1949 | Kenyon | 536/45 |
| 2,557,473 | 6/1951 | Ryan | 536/105 |
| 3,377,339 | 4/1968 | Sisido | 536/105 |
| 4,160,013 | 7/1979 | Whelan | 423/402 |

FOREIGN PATENT DOCUMENTS 703933  2/1965  Canada .

*Primary Examiner*—Jeffrey C. Mullis
*Attorney, Agent, or Firm*—K. W. Zerby; J. J. Yetter; J. C. Rasser

[57] ABSTRACT

Starch is oxidized in a controlled manner using nitric acid, sulfuric acid and vanadium catalyst. The resulting oxidized starch is useful in detergent compositions as a dispersant, builder and cleaning auxiliary.

2 Claims, 1 Drawing Sheet

C6/C2-C3 OXIDIZED STARCH AS DETERGENT INGREDIENTS

This is a continuation of application Ser. No. 08/068,452, filed on May 28, 1993, now abandoned, which is a division of application Ser. No. 07/791,839, filed on Nov. 14, 1991, now abandoned.

FIELD OF THE INVENTION

The present invention relates to oxidized starch and its use in detersive compositions, especially laundry and automatic dishwashing detergents, as a soil dispersant and cleaning auxiliary.

BACKGROUND OF THE INVENTION

The formulation of modern detergent compositions, especially granular laundering compositions, has involved the use of a variety of materials, including sophisticated surfactants, enzymes, bleaches, fabric softeners, pH control agents, and the like. Typically, such compositions contain a builder material which serves a variety of functions, including water hardness sequestration, soil peptization, pH control, and the like. For many years, sodium tripolyphosphate was the builder of choice and, by itself, performed the aforesaid functions quite admirably. However, in recent years sodium tripolyphosphate has been removed from many detergent compositions. Currently, many fully-formulated detergent compositions contain a zeolite builder, a polycarboxylate builder, or mixtures thereof.

The development of high performance laundry and automatic dishwashing detergent compositions without phosphates has been a considerable challenge to the industry. From the performance standpoint, even the best sequestering builders may not optimally peptize soils or otherwise act as a dispersing agent and antiredeposition agent for soil that has been removed from fabrics. As can be imagined, in the modern automatic washing machine suboptimal performance will occur if solid soil that has been removed from the fabrics by the surfactant process were to redeposit onto the fabrics. In the dishwasher context, lime scale deposition on dishes and glassware remains problematic.

These shortcomings in phosphate-free granular detergents are well-known to formulators. Various dispersing and antiredeposition agents have been introduced into nonphosphate detergent compositions in order to enhance their performance. Typically, such materials have been prepared from synthetic polycarboxylate polymers, for example, polymers comprising acrylate, maleate or methacrylate moieties. While such synthetic polymers perform their intended use, they do have some drawbacks. For example, formulators of modern nonphosphate granular laundry detergents and, in particular, granular automatic dishwashing detergents, would prefer to use dispersing agents at levels up to about 12%, or greater, in products. However, this is difficult with polyacrylates since they are mainly based on petrochemical feedstocks rather than renewable resources. And, some petrochemical-based dispersants may not be sufficiently biodegradable to meet modern standards.

In light of the foregoing, there has been a continuing search for new dispersing agents for use in laundry detergents, automatic dishwashing detergents, and the like. The present invention employs natural starch which has been oxidized in the manner described hereinafter to achieve these desirable benefits.

BACKGROUND ART

U.S. Pat. No. 5,009,882 (Degenhardt and Kozikowski) relates to carboxy starch polymers which can be used to inhibit dental plaque. Starches with designated substituent groups X, Y, Z and W as carboxy are noted as being one type of plaque-inhibiting starch material.

U.S. Pat. No. 3,665,000 (Hills), issued May 23, 1972, assigned to FMC Corporation, contemplates an oxidized starch in which the percentage of carboxy units appears to be substantially higher than the oxidized starch herein.

U.S. Pat. No. 3,784,475 (Diehl), issued Jan. 8, 1974, assigned to The Procter & Gamble Company, relates, inter alia, to detergent compositions containing oxidized polysaccharide builders. The builders are taught to have a molecular weight of 4,000 to 5,000,000, preferably 25,000 to 2,000,000. The materials are derived from alginic acid, and have a stereochemistry which would be different from the oxidized starches herein. Moreover, while the '475 materials presumably function as builders by virtue of their polycarboxy units, their expensive alginic acid precursor would tend to make them expensive for ordinary detergency use.

Various oxidation processes relating to the oxidation of starch and/or saccharides have been the subject of rather wide interest in many scientific publications and patents, including the following.

"New Industrial Products from Starch", Starch 40 (1988) Nr. 4, S. pp. 121–131.

"Oxidation of Maltodextrins and Starch by the System Tungstate-Hydrogen Peroxide", M. Floor et al, Starch 41 (1989) Nr. 8, S. pp. 303–309.

"New Glucuronoglucans Obtained by Oxidation of Amylose at Position 6", Painter et al, Carbohydrate Research, 140 (1985) pp. 61–68.

U.K. 1387569 relates to the stabilization of oxidized polysaccharides and use thereof as detergency builders. A sodium borohydride-treated dicarboxyl starch is noted.

CHEMICAL ABSTRACTS CA109(2):8322w relates to the manufacture of tricarboxystarch cation exchangers.

CA78(9):57049n relates to granular fertilizers based on oxidation products of polysaccharides.

"The Oxidation of Starch", Starch and its Derivatives, pp. 306–353.

"Preparation and Calcium Complexation of Oxidized Polysaccharides", Floor et al, Recl. Tray. Chim. Pays-Bas 108, (1989) pp. 384–392.

"Polycarboxylic Acids Containing Acetal Functions: Calcium Sequestering Compounds Based on Oxidized Carbohydrates", Nieuwenhuizen et al, JAOCS, Vol. 60, No. 1 (1983) pp. 120–124.

"Polycarboxylates Made of Polysaccharides, Wood, and Substances with Wood-Like Composition, as Novel Sequestering Agents".

"Preparation and Calcium Complexation Properties of a Series of Oxidized Polysaccharides", Nieuwenhuizen et al, Starch 37 (1985) Nr. 6, S. pp. 192–200.

"Preparation and Calcium Complexation of Oxidized Polysaccharides," Floor et al, Starch 41 (1989) Nr. 9, S. pp. 348–354.

"Starch-Derived Polyelectrolytes as Builders in Heavy Duty Detergent Formulations", Wilham et al, ARS USDA, Vol. 47 (1970), pp. 522–524.

See: U.S. Pat. No. 2,472,590 (issued Jun. 7, 1949); U.S. Pat. No. 2,730,524 (issued Jan. 10, 1956); U.S. Pat. No.

2,758,112 (issued Aug. 7, 1956); U.S. Pat. No. 2,894,945 (issued Jul. 14, 1959); U.S. Pat. No. 2,999,090 (issued Sep. 5, 1961 ); U.S. Pat. No. 3,203,885 (issued Aug. 31, 1965); U.S. Pat. No. 3,377,339 (issued Apr. 9, 1968); U.S. Pat. No. 3,450,692 (issued Jun. 17, 1969); U.S. Pat. No. 3,629,121 (issued Dec. 21, 1971); U.S. Pat. No. 3,665,000 (issued May 23, 1972); U.S. Pat. No. 3,740,339 (issued Jun. 19, 1973); U.S. Pat. No. 3,784,475 (issued Jan. 8, 1974); U.S. Pat. No. 3,790,561 (issued Feb. 5, 1974); U.S. Pat. No. 3,873,614 (issued Mar. 25, 1975); U.S. Pat. No. 4,100,341 (issued Jul. 11, 1978); U.S. Pat. No. 4,550,196 (issued Oct. 29, 1985).

See also: European Patent Application 123,495 (published Oct. 31, 1984); British Patent Specification 1,330,122 (published Sep. 12, 1973); British Patent Specification 1,330,123 (published Sep. 12, 1973); German Patent 2,436,843 (published Feb. 12, 1976); German Patent 2,213,955 (published Sep. 28, 1972); Netherlands Patent Application 8,802,907 (published Nov. 25, 1988).

It is common to oxidize starch with nitric acid in the presence of vanadium catalysts, but with the formation of oxalic acid, saccharic acid or "nitrohumic" acid, rather than the oxidized starch of this invention. The following CHEMICAL ABSTRACTS references are illustrative: CA114(25):246823h; CA114(5):42080d; CA113(13):114654y; CA109(12): 95106v; CA72(5):21325m; CA113(23): 211376s; CA113(17):151841c; CA113(2):8356t; CA83(8):62339q; CA78(11):70759p; CA98(10):74157b; and CA87(19):151665t.

SUMMARY OF THE INVENTION

The present invention encompasses an oxidized starch polymer or salt thereof (abbreviated herein as "OXST") having a minimum molecular weight (MW) of about 500 and a maximum molecular weight of about 60,000, preferably from about 1,500 to about 20,000, more preferably from about 3,000 to about 10,000, said polymer comprising:

(a) at least 60 mole percent of the C6 position of the starch glucoside units oxidized to carboxyl groups;

(b) from about 5 to about 40 mole percent of the C2–C3 positions, oxidized to carboxyl groups; and (c) no more than about 40 mole percent of unoxidized C6 moieties.

Preferred oxidized starch herein comprises a polymer characterized by:

(a) about 70 to 90 mole percent C6 moieties oxidized to carboxyl;

(b) about 20 to 35 mole percent C2–C3 moieties oxidized to carboxyl;

(c) about 10 to 30 mole percent unoxidized C6 moieties; said polymer having a molecular weight distribution of: about 20% by weight less than about 1,000; about 60% by weight in the range from about 1,000 to about 10,000; and the balance in the range from about 10,000 to about 30,000, preferably a median molecular weight of about 3,500.

The invention herein also encompasses detergent compositions, comprising one or more detersive surfactants, optional builders and detersive adjuvants, and at least about 1% by weight of an oxidized starch polymer of the above-described types. Preferred detergent compositions herein comprise from about 2% to about 35% by weight of said oxidized starch polymer.

Highly preferred liquid or granular laundry or liquid (typically, gel) or granular automatic dishwashing detergents are those wherein said oxidized starch polymer has a median molecular weight of about 3,500.

Typical granular detergent compositions herein will contain at least about 3% of a detergency builder, for example, a zeolite builder or a layered silicate builder. Heavy-duty granular detergents will typically contain at least about 10% (e.g., 10% about 50%) by weight of a Zeolite A builder or a layered silicate. Other builders useful in both liquid and granular compositions include carboxylate builders such as oxydisuccinate, tartrate monosuccinate, tartrate disuccinate, alkyl and alkenyl succinates, citrate, or mixtures thereof; mixtures of said carboxylate builders with a zeolite builder are known for use in granular compositions.

The oxidized starch described hereinabove can also provide a useful detergency builder function, typically at 5%–35% levels in fully-formulated laundry detergents. In an alternate mode, the oxidized starch herein can be provided in a molecular weight range down to about 200. Oxidized starch, especially in the lower molecular weight range (e.g., 200–500), is especially useful as a detergency builder at typical builder.

The invention also encompasses a method for laundering fabrics or dishes comprising contacting said fabrics or dishes with the aforesaid compositions.

The invention herein also provides a method for oxidizing starch at the C6/C2–C3 positions in a controlled manner (and the oxidized starch made thereof), comprising:

(a) dispersing starch in strong (as specified below) aqueous sulfuric acid, preferably containing a vanadium catalyst necessary for step (b);

(b) reacting the starch of Step (a) with nitric acid in the presence of a strong acid selected from the group consisting of sulfuric acid, trifluoromethanesulfonic acid and methanesulfonic acid and in the presence of a catalytic amount of $NO_2$ to secure at least 60 mole percent oxidation at the C6 position; and, preferably, (c) precipitating OXST away from the sulfuric acid;

(d) carefully neutralizing the OXST with base; and (e) reducing residual ketones in the OXST, preferably with borohydride.

Preferably, the Step (b) oxidation is carried out at a temperature from about 25° C. to about 35° C. in the presence of added nitrite salt and a vanadium catalyst. Most preferably, the method is carried out using 70% concentrated HNOs, 65%–85% aqueous concentrated $H_2SO_4$, $NaNO_2$, ammonium vanadate, and the oxidation is allowed to proceed for a period of no longer than about 5 hours.

More specifically, the preferred oxidation process is preferably conducted as follows.

Step 1: A starch dispersion is prepared comprising from about 25% to about 45% (wt.) starch in sulfuric acid, said sulfuric acid being in the concentration range of from about 65% to about 85% (wt.), said dispersion step being carried out at a temperature from about 10° C. to about 25° C.;

Step 2: The starch dispersion from Step 1 is oxidized with nitric acid in the presence of nitrite ion and a vanadium catalyst under the following conditions:

(a) the oxidation temperature is from about 20° C. to about 40° C.;

(b) the starch comprises from about 20% to about 30% by weight of the reaction mixture of Step 2;

(c) the weight percentage of nitric acid (calculated as 100% $HNO_3$) comprises from about 0.75 to about 1.3 times the weight percentage of starch in the reaction mixture;

(d) the weight percentage of nitrite (preferably as $NANO_2$) comprises from about 0.004 to about 0.05 times the weight percentage of starch;

(e) the weight percentage vanadium catalyst, calculated as elemental vanadium, comprises from about 0.0004 to about 0.004 times the weight percentage of starch; and (f) the balance of the reaction mixture of Step 2 comprises sulfuric acid, at a concentration from about 50% to about 70% by weight.

Note: The concentration of $H_2SO_4$ is defined by:

$$\frac{\text{weight sulfuric acid}}{\text{weight total* water} + \text{weight sulfuric acid}}$$

*Total water comprises the amount from the $HNO_3$ plus added water.

The oxidation process is typically carried out for a period of 4.5 hours after adding nitric acid to the starch dispersion.

Following the Step 2 oxidation, the oxidized starch is precipitated from the reaction mixture, conveniently by addition of an alcohol or ketone, e.g., methanol, ethanol, isopropanol or acetone. The oxidized starch is then neutralized to pH about 7, e.g., with a base such as NaOH, $NaHCO_3$ or $Na_2Co_3$. Residual ketones in the oxidized starch can then be reduced, e.g., with sodium borohydride. Typically, the sodium borohydride weight is between 0.5% and 1.5% of the initial weight of the starch.

The invention also encompasses the oxidized, preferably non-alginate-derived, starch prepared by the foregoing process.

All ratios, proportions and percentages herein are by weight, unless otherwise specified as mole fractions.

Figure 1A:
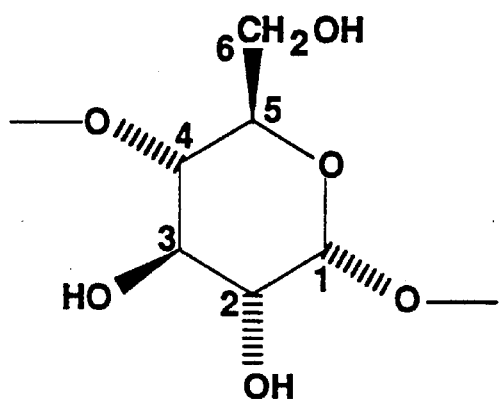
FIG. 1(A) illustrates the stereochemistry of glucose, which is the basic structural component of starch, together with standard carbon position numberings 1 through 6.
Figure 1B:
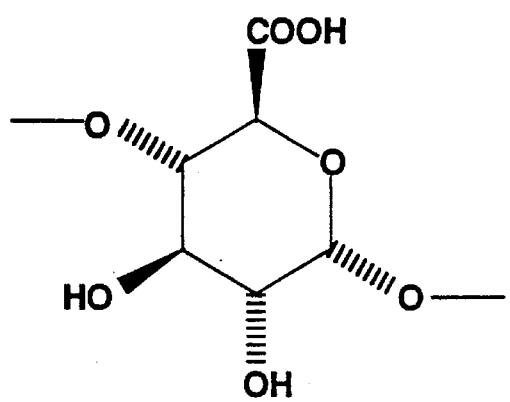
FIG. 1(B) illustrates the oxidation product of starch glucose at position 6 to form a "6-ox", i.e., glucuronic acid, residue.
Figure 1C:
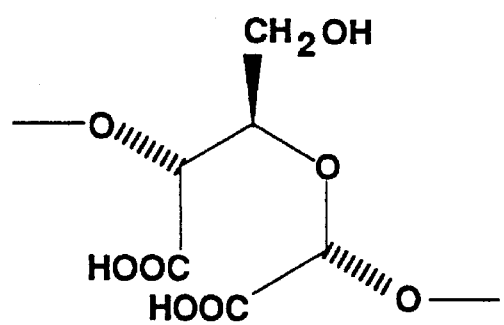
FIG. 1(C) illustrates the oxidation product of starch glucose at the 2–3 bond to form a "2,3-ox", i.e., dicarboxy starch, residue.
Figure 1D:
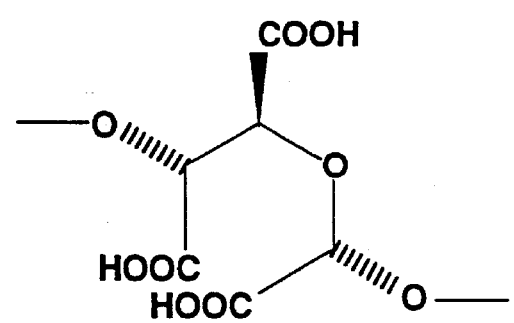
FIG. 1(D) illustrates the oxidation product of starch glucose at the 6 position and at the 2–3 bond to form a "2,3,6-ox", i.e., tricarboxy starch, residue, abbreviated herein as "C6/C2–C3". Starch oxidized at C6/C2–C3 is provided by the practice of this invention.
Figure 1E:
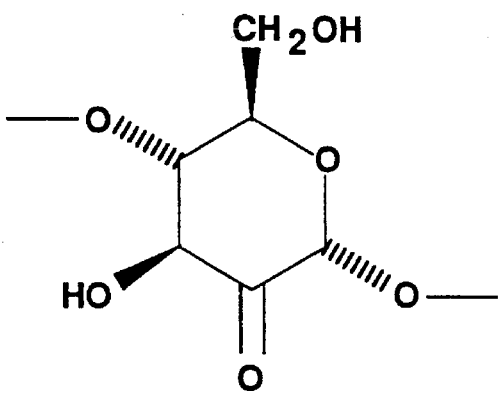
FIG. 1(E) illustrates the 2-keto form of starch glucose.

The Figures each illustrate the acid forms of the residues. Salt forms, especially water-soluble salts such as sodium, potassium, ammonium, alkanol ammonium, and the like, are contemplated herein.

DETAILED DESCRIPTION OF THE INVENTION

The reaction chemistry used to prepare the oxidized starch in the manner of the present invention involves oxidation using nitric acid and sulfuric acid, preferably in the presence of a vanadium catalyst and $NO_2$ as initiator. $NO_2$ can be generated from a nitrite salt or from the reaction of nitric acid with phenol or the like. The oxidation is, primarily at the C6 position with some oxidation occurring at the C2, C3 position. The oxidation converted the C6 position and some C2, C3 positions to carboxyl groups. Other C2, C3 positions are oxidized to ketones. Proper selection of reactants and reaction conditions yields an oxidized starch which has the desired molecular weight range and degree of oxidation at the C6 and C2–C3 positions to function as a dispersant for laundry detergents and automatic dishwashing detergents, yet be reasonably biodegradable and/or removable from water supplies by adherence to sludge in standard sewage treatments. Details of the reactants and reaction conditions are as follows.

Starch—The starch employed in the practice of the present invention can be secured from any convenient source of polyglucosidic starch. Typical examples include cornstarch and potato starch, but other vegetable starches can be employed.

The overall process for preparing OXST of this invention is as follows.

Starch Dispersion—Prior to oxidation, a homogeneous starch dispersion is prepared in aqueous sulfuric acid. This step is important for producing uniformly oxidized OXST (eg. the low MW OXST has about the same degree of oxidation as the high MW OXST). (In mechanistic terms, uniform oxidation is achieved by promoting penetration of nitric acid into the interior of the starch granule.) Keys to making a homogeneous starch dispersion are: (a) aqueous sulfuric acid between 65% and 85%, (b) temperatures at room temperature and below (typically 10–15C.), and (c) keeping the dispersion viscosity high during the addition of the starch.

Starch Oxidation—Nitric acid in the presence of a catalytic amount of nitrogen oxide initiator can oxidize a) the C6 position to a carboxyl group and b) the C2 and C3 positions to ketone groups. The amount of nitric acid determines the degree of OXST oxidation. Vanadate species (V(V)) can cleave a C2 or C3 ketone to give carboxyl groups at the C2 and C3 position, but it is not capable of cleaving the C2–C3 bond unless a ketone group is present at one of the two positions. Vanadyl species (V(IV)) can be oxidized back to V (V) by nitric acid, so that only catalytic amounts of vanadium are necessary for the starch oxidation. Only catalytic amount of nitrogen oxide initiator is necessary since nitric acid is reduced to nitrogen oxides as the reaction proceeds. In an industrial process, the nitrogen oxides could be converted to nitric acid.

In order to make OXST commercially viable, the oxidation must have several features: a) OXST with the desired degree of oxidation and MW is produced, b) the reaction times must be kept below 8 hr, c) the reaction exotherm must be controllable, and d) OXST can be separated from the reaction medium. Sulfuric acid is important to all the features. It lowers the activity of water, thus minimizing glycosidic bond hydrolysis. It increases the rate of oxidation and promotes nearly complete consumption of nitric acid (important during work-up since residual nitric acid would react with the alcohol used in precipitation of OXST). It also serves as the reaction solvent, especially at the end of the reaction when nearly all the nitric acid has been converted to gas.

Controlling the reaction temperature is also important to all the features. Too high a temperature and the reaction exotherm is uncontrollable, MW is reduced, and decarboxylation occurs. Too low and the reaction times become unacceptably long.

Keeping the starch concentration as high as possible (within viscosity restraints) decreases the reaction time while minimizing the amount of alcohol necessary for precipitation.

Precipitation and Neutralization—Precipitation of the starch away from the sulfuric acid has two advantages: a) sulfuric acid and vanadium largely. remain in the filtrate facilitating their recycle; and b) the amount of base necessary for neutralization is decreased. In an industrial process, the ethanol could be distilled from the filtrate and recycled. Neutralization must proceed without having localized high concentrations of base. Ketone groups in the OXST make it very labile to chain cleavage above pH 11.

Sodium Borohydride Treatment—Reducing the residual ketone groups in the OXST to alcohols with borohydride allows the OXST to be stable to alkaline wash conditions (see UK 1,387,569).

The following illustrates a preferred oxidation of starch.

EXAMPLE I

Starch Dispersion—Into a 4 liter beaker fitted with a thermometer and jiffy-Mixer impeller is added Amaizo 100 unmodified corn starch (200.0 g, 1.23 mol glucoside) (Note 1) and a chilled (to 10° C.) solution of ammonium vanadate (1.60 g, 0.014 mol) (Note 2) in 78% aqueous sulfuric acid (367.0 g). In order to form a homogeneous dispersion, a 9 g portion of starch is vigorously stirred (with a spatula) into 14 g of acid solution to form a dispersion with taffy-like consistency. To this dispersion is added another-portion of acid (17 g) to obtain a batter-like consistency. Then another portion of starch is added to form a taffy-like dispersion. This process is repeated until all the starch is dispersed. The amount of starch and acid can be increased in successive additions, so long as the viscosity does not drop below the batter-like consistency (Note 3).

Oxidation—To the chilled (to 15° C.) starch dispersion is added chilled (to 10° C.) 70.2% nitric acid (249.0 g, 2.77 mol). The nitric acid is added over 15 minutes in small portions with vigorous mechanical stirring. The reaction mixture temperature is allowed to rise to 25° C. and sodium nitrite (12.0 g, 0.17 mol) is added with stirring. An exotherm develops in 2–5 minutes and the reaction temperature is kept between 25° C. and 30° C. by intermittent use of an ice bath. Nitrogen dioxide, a toxic red gas, begins to evolve from the reaction as the exotherm begins, foam is generated, and the reaction mixture develops a green color. As the reaction proceeds, the mixture becomes entirely a viscous foam. Constant stirring is required throughout the reaction to break up foam and keep the reaction volume at 2X the original volume or below (Note 4). Both the exotherm and gas evolution increase to a maximum at a reaction time (starting at the nitrite addition) of about 50 minutes, hold at maximum until 75 minutes and then begin to subside. The viscosity of the reaction follows the same trend, increasing to a maximum between 60 and 90 minutes and then decreasing. After a reaction time of 90 minutes the reaction temperature is allowed to rise to 32° C. and is maintained at that temperature until a total reaction time of 270 minutes; cooling (with ice bath) is required at the beginning of this period, but at the end heating is necessary (with a hot water bath) (Note 5). The reaction is blue-green at the end. Analysis of the reaction mixture before work-up is as follows: % nitrate nitrogen=0.13, % nitric acid consumption=>96, total degree of carboxylation=1.5 carboxyls per glucoside, degree of C6 carboxylation=0.86 carboxyls per glucoside, MW distribution ("K"=1000): 28% <1K, 1K<18%<5K, 5K<24%<10K, 10K<12%<20K, 17%>20K, median MW=4000.

Work-up—Workup is begun by cooling the reaction mixture to 15° C. and adding chilled ethanol (1300 mL) with vigorous stirring. Oxidized starch (OXST) precipitates as a white (with green tint), crumbly solid. The mixture is chilled to 5° C. for 10 minutes and vacuum filtered through an extra-coarse sintered glass funnel. The precipitate is washed with chilled ethanol (200 mL) and suction-filtered to remove the majority of ethanol (Note 6). The precipitate is then added in small portions with vigorous mechanical stirring to a 4 liter beaker containing water (250 mL). The sintered glass funnel is washed with water (70 mL) and the washings are added to the product solution. This solution is rotary evaporated (water aspirator vacuum, water bath temperature 45° C.) for 30 minutes to remove ethanol. The pH of the solution is brought to 7 with 21% aqueous sodium carbonate. When the solution is at pH 7 it is filtered again to remove a small amount of solid (Note 7). Total reaction weight is 2110 g. Sodium borohydride (3.0 g, 0.079 mol) is added with stirring to the solution and allowed to stand overnight at room temperature. The pH of the solution is about 8–9 (Note 8). The solution is concentrated by rotary evaporation to 700 mL and freeze-dried to give OXST as a white solid (350 g, eldmental analysis (Note 9): 19.24% C, 2.46% H, 0.5% N, 8.38% S, 0.073% V, 4.96% water (Karl Fischer), 58% active, 80% yield, 63% vanadium removal, total degree of carboxylation =1.27 carboxyls per glucoside, degree of C6 carboxylation =0.86 carboxyls per glucoside, acid content =4.68 mmol per g, MW distribution: 26.6%<1K, 1K<30%<5K, 5K<16%<10K, 10K<15%<20K, 11%>20K, median MW 3700 (Note 10).

Note 1—A variety of polysaccharides can be oxidized in this procedure: starches (corn, potato, rice, arrowroot, tapioca, wheat, sago); and dextrans.

Note 2—Any source of vanadium (+5) species can be used as a catalyst: nonlimiting examples include vanadium oxide; ammonium vanadate; vanadium oxychloride; vanadium acetylacetonate.

The catalyst amount is between 1 and 0.1 mol % based on moles of glucoside. The use of iron or copper as co-catalysts (common in adipic acid manufacture) may optionally be employed.

Note 3—Several factors are important in making homogeneous starch dispersions in sulfuric acid. The aqueous sulfuric acid used is between 65% and 85%. Below 65% the starch case-hardens (i.e., the outside of the starch particle hydrates and prevents further penetration of acid) and forms difficult-to-disperse lumps. Above 85% concentration of $H_2SO_4$ charring of the starch occurs.

Temperatures at room temperature and below (typically, 10° C.–15° C.) desirably also: (a) minimize charring; and (b) promote slower and more uniform penetration of the acid into the starch granule so as to minimize clumping.

Keeping the viscosity of the dispersion high also promotes slower and more uniform penetration of acid into the starch granule, thereby also minimizing clumping. Mixing the starch/acid portionwise also helps minimize clumping.

Note 4—Placement of the thermometer in the foam is important for making reproducible readings: horizontal—slightly away from the beaker wall and vertical—midway in the foam. The temperature can vary 6° C. from top of foam to bottom.

Note 5—Several reaction variables are important for obtaining OXST with the desired degree of carboxylation and MW.

The starch is dispersed in sulfuric acid prior to nitric acid addition, so as to avoid premature initiation of the reaction before the mixture is homogeneous.

The viscosity of the reaction after the nitric acid is added should have at most a batter-like consistency and preferably should be a thin syrup. During the reaction the viscosity builds (partly due to conversion of nitric to nitrogen oxide gases). If the viscosity is much higher than this at the start, it is difficult later to control the exotherm of a highly viscous mixture because of poor heat transfer.

Temperature must be maintained below 35° C. to prevent (a) unacceptable MW reduction; and (b) decarboxylation. Temperatures above 25° C. are needed to obtain reaction times below 8 hours.

The amount of nitric acid used determines the OXST degree of carboxylation (DC), the more nitric, the higher the DC. Excess nitric acid is not used to drive the reaction because it is desired to have >95% nitric consumption due to workup considerations.

The ratio of sulfuric acid to the total water in the reaction (e.g., the amount used in making the dispersion plus that introduced with the 70% nitric acid) has important consequences for the OXST MW and reaction rate. Expressed as weight % sulfuric acid=sulfuric/(sulfuric+total water), weight % sulfuric is between 55% and 70%. Sulfuric acid has two functions: (1) it lowers the activity of water, thus minimizing MW reduction caused by hydrolysis of the glycosidic bond; and (2) it increases the reaction rate probably by (a) increasing the rate of nitrous ester formation; and (b) increasing the rate of vanadium-catalyzed cleavage of ketols (by increasing the oxidation potential of the V+5 to V+4 redox couple). The limit of 70% is set because the exotherm becomes difficult to handle above this value. If equipment which allowed extremely good heat transfer was available, the % sulfuric acid could be increased.

Starch concentration in the reaction is kept between 15% and 30% of the reaction weight. The higher limit is set because of viscosity restraints. The lower limit is set so as to minimize the amount of sulfuric acid needed for the reaction.

Any compound which can form $NO_2$ or nitrous acid in the reaction mixture can be used to initiate the reaction, e.g., nitrite salts and compounds which are oxidized readily by nitric acid (i.e., bisulfite or formic acid). In addition, the heel of a previous reaction which contains residual $NO_2$ can be used.

On an industrial scale it would be desirable to regenerate nitric acid from the $NO_2$ by air oxidation.

An antifoaming agent (i.e., silicone) may be advantageous in large scale syntheses.

The oxidation of starch with nitric acid and vanadium catalyst is known, but the reaction conditions are so vigorous that oxalic acid is the oxidation product, not OXST.

Note 6—Precipitation of the OXST away from the sulfuric acid reduces greatly the amount of base necessary for neutralization. In addition, the OXST is contaminated with much less sodium sulfate, an important factor for formulation in liquid detergents. The precipitation has several key points: the nitric acid consumption in the reaction should be >95%, otherwise the alcohol used in the precipitation will react violently with the nitric acid; ethanol or methanol can be used in the precipitation; the alcohol used in the precipitation can be distilled away from the sulfuric acid, so that both the sulfuric acid and alcohol can be recycled; filtration must be carried out cold so that OXST is an easily filtered solid, not sticky; about 60% of the vanadium catalyst remains in the sulfuric acid and 40% on the OXST. That remaining in sulfuric acid can be recycled for use in another reaction.

Note 7—Carbonate instead of caustic is used for neutralization to avoid localized areas of high pH. High pH at this point in the procedure will cause MW reduction of the OXST. If very efficient mixing is used, caustic can be used to neutralize.

Note 8—Sodium borohydride is used to reduce ketones in the OXST to alcohols. Ketones make the starch vary labile to chain cleavage under basic conditions. The pH of the solution is important for optimum reduction. Below pH 6 the borohydride decomposes without performing any reduction. Above pH 11 the base-catalyzed chain cleavage becomes as fast as reduction. A pH between 7 and 11 is best.

Note 9—Elemental analyses and Karl-Fischer water determinations are available at Galbraith Laboratories, Inc., P.O. Box 551610, Knoxville, Tenn. 37950-1610.

Note 10—Analyses of the crude reaction mixture and the worked-up product lead to the following conclusions:

Greater than 96% of the nitric acid is consumed in the reaction.

Total degree of carboxylation is slightly lower after work-up as compared to before work-up. The first step in the work-up (precipitation of OXST from the sulfuric acid) could leave a low MW fraction in the sulfuric acid. The low MW fraction could be more highly oxidized than the higher MW component.

The OXST MW also decreases after work-up as compared to before work-up. Base-catalyzed chain cleavage during the borohydride treatment is probably responsible.

The OXST sample after work-up is composed of 58% OXST, 37% sodium sulfate, and 5% water as deduced from elemental and KarlFischer analysis.

EXAMPLE II

Synthesis of OXST (MeOH Precipitation and Vanadium Removal by Ion-Exchange) Starch Dispersion and Oxidation (proceeds as in Example I)

Work-up—Work-up is begun by cooling the reaction mixture to 0° C. and adding chilled methanol (650 mL) with vigorous stirring. Oxidized starch (OXST) precipitates as a light-green sticky gum. The sulfuric acid solution is decanted away from the gum and the gum is dissolved in water (70 mL). This aqueous solution is passed through strong acid ion-exchange resin (Dowex 50W-X8, 1000 g) to remove vanadium. The resin is washed with water (100 mL). The washings and OXST solution are combined to give 539.2 g solution. The pH of the solution is brought to 6.9 or 7 with 21% aqueous sodium carbonate and filtered again to remove a small amount of solid; the resulting solution weighs 2270 g. Sodium borohydride (3.0 g, 0.079 mol) is added with stirring to the solution and allowed to stand overnight at room temperature. The pH of the solution is about 8–9. The solution is roto-vapped under aspirator vacuum to remove residual ethanol (which interferes with freeze-drying) and freeze-dried to give OXST as a white solid (256 g, elemental analysis: 19.1% C, 2.65% H, 0.5% N, 7.96% S, 0.006% V, 5.2% water (Karl Fischer), 56% active, 57% yield, 98% vanadium removal, total degree of carboxylation =1.19 carboxyls per glucoside, degree of C6 carboxylation=0.82 carboxyls per glucoside, acid content= 4.64 mmol per g. MW distribution: 20%<1K, 1K<35%<5K, 5K<9% <10K, 10K<15%<20K, 20%>20K), median MW=6000.

Note 11—Precipitation with methanol is not as efficient as precipitation with ethanol. A substantial amount of low MW OXST remains in the sulfuric acid.

Note 12—Acid ion-exchange resin is very effective at removing vanadium from OXST.

Characterization of OXST

Total Degree of Carboxylation and Degree of C6 Carboxylation Both analyses are determined by integration of the 13CNMR spectrum of OXST. Both analyses use the anomeric acetal carbon integration as a reference since there is one anomeric carbon per glucoside.

$$\text{Total degree of carboxylation} = \frac{\text{Carboxyl Carbon Integration}}{\text{Anomeric Acetal Carbon Integration}}$$

$$\text{Degree of C6 Carboxylation} = 1 - \frac{\text{C6 Carbon Integration}}{\text{Anomeric Acetal Carbon Integration}}$$

Carboxyl carbon resonances are between 170 and 182 ppm.

Anomeric acetal resonances are between 95 and 105 ppm.

C6 methylene resonance is between 59 and 62 ppm.

The 13CNMR acquisition must allow for nearly complete spinlattice relaxation to obtain meaningful integrations. Two procedures are used to ensure relaxation of the carbon nuclei: (1) long pulse delays and (2) PARR (diethylenetriaminepentaacetic acid, iron (III) disodium salt dihydrate, 98%) spin-lattice relaxation agent (see Anal. Chem., 54, 615 [1982]).

The NMR instrument parameters for the long pulse delay procedure is as follows:

Instrument: General Electric 300 MHz

Pulse delay: 15.81 sec.

Pulse: 60 degrees

Spin rate: 23 rps

Decoupler: inverse gated decoupling technique

Number of scans: 5,000–10,000

The NMR instrument parameters using PARR are as follows:

Instrument: Bruker 300 MHz

Pulse delay: 1 sec.

Pulse: 40 degrees

Spin rate: 20 rps

Decoupler: on (broad band)

Number of scans: 5,000–10,000

Two NMR sample preparations are employed depending on the form of the OXST. If the OXST sample is partially neutralized or neutralized and is freeze-dried, 300 mg of OXST sample is dissolved in 1.2 mL of D20 (long pulse delay method) or 1.2 mL of 0.05M PARR in D20(PARR method).

If the OXST sample is an aliquot of the reaction mixture, the following procedure is used. Five grams of the reaction mixture are dissolved in 5 ml water. The pH of the solution is adjusted to 7–9 with saturated sodium carbonate solution or 50% sodium hydroxide. The solution is rotary evaporated with aspirator vacuum to a dry solid. The solid is dissolved in 6 ml of D20 (long pulse delay method) or 6 mL of 0.05M PARR in D$_2$O (PARR method).

Molecular Weight Determination—The molecular weight (MW) of OXST samples was determined with gel permeation chromatography using polyacrylates as MW calibration standards. Since the MW distribution of most OXST samples is bimodal, the traditional ways of reporting MW (e.g., MW number average and MW weight average) are not useful. Instead, the percent of the sample in a particular MW range is reported as well as the median MW (the MW at which 50% of the sample is above and below that value). The instrumentation and HPLC parameters are listed below:

Instrumentation: Waters 600 Series with refractive index detector Waters Ultrawisp 715

Data analysis: Waters Maxima 820 GPC option data analysis software

Column: 1 Ultrahydragel 1×250 angstrom connected in tandem with 2 Waters Ultrahydragel 2×120 angstroms in that respective order MW standards: American Polymer Laboratories polyacrylic acid sodium salts: PAA1K, PAA2K, PAA3K, PAA4K, PAA8K, PAA18K, PAA35K, PAA70K Calibration: cubic fit Mobile phase: 0.10M pH 7.2 sodium phosphate buffer which is 0.3M in sodium nitrate Flow rate: 0.75 mL per minute Injection volume: 50 microliters Analysis time: 45 minutes Sample concentrations for GPC analysis are ca. 1.0% OXST and the sample pH is about 6.4. Samples for analysis are typically prepared by dissolving 0.5 g OXST in 25 mL water and adjusting the pH to 6.4 with saturated sodium carbonate. The sample volume is then brought to 50 mL in a volumetric flask.

Acid Content—If the sample contains salts, they are removed by dialysis. A weighed aliquot (containing ca. 5 g of OXST) is dialyzed 24 hours against deionized water (17 L) using SpectraPor cellulose dialysis tubing, MW 1000 cutoff, 18 mm wide. The dialysate is freeze-dried to a white solid and its acid content determined using the procedure described in Starch, 37(6), 192(1985).

Nitrate Analysis—A weighed aliquot of the reaction mixture (ca. 0.5 g) is adjusted to pH 7 with 5N NaOH and diluted to 500 mL in a volumetric flask. The mg/L nitrate nitrogen for this solution is determined with the Cadmium Reduction Method Using NitraVer 5 Nitrate Reagent AccuVac Ampuls—Hach Company Procedures Manual for Portable Calorimeter Model DR/1A (1987), page 2a–31. (Further dilution may be necessary if the nitrate content is outside the range of the method.)

$$\% \text{ Nitrate nitrogen} = \frac{\text{nitrate nitrogen concentration (mg/L)}}{\text{sample concentration (mg/L)}} \times 100$$

% Nitric Acid Consumption $$\% \text{ Nitric acid con.} = \frac{\% \text{ nitrate nitrogen} \times \text{final reaction weight}}{\text{initial nitric acid nitrogen}} \times 100$$

Initial nitric acid nitrogen = (mol nitric acid in reation) × 14

% Yield $$\% \text{ Yield} = \frac{\text{total carbon in OXST product}}{\text{total carbon in starch starting material}} \times 100$$

OXST is assumed to be the only source of carbon in the OXST product.

Total carbon contained in the OXST product is determined by its % C (determined by elemental analysis) multiplied by product weight.

Total carbon contained in the starch starting material is determined from % C in the starting starch (44% as calculated from the glucoside molecular formula $C_6H_{10}O_5$ and molecular weight=162) multiplied by starch weight.

% Active $$\% \text{ Active} = \frac{\% \text{ carbon in OXST product}}{\% \text{ carbon in pure OXST}} \times 100$$

$$\% \text{ carbon in pure OXST} = \frac{\text{mol C in glucoside monomer unit} \times 12.01}{\text{OXST MW}} \times 100$$

OXST MW = 162 + 36 × (total degree of carboxylation)

% Sulfate $$\% \text{ sulfate} = \frac{\% \text{ sulfur in OXST product}}{\% \text{ sulfur in sodium sulfate}} \times 100$$

Sodium sulfate is assumed to be the only source of sulfur in the OXST product.

$$\% \text{ sulfur in sodium sulfate} = \frac{\text{MW of sulfur}}{\text{MW of sodium sulfate}} \times 100$$

% Vanadium Removal $$\% \text{ vanadium removal} = 1 - \frac{(\% \text{ vanadium in OXST sample} \times \text{OXST sample wt.})}{(\text{vanadium [wt.] used in reaction})} \times 100$$

% vanadium and vanadium (wt.) refer to elemental-vanadium.

Laundry Compositions

The oxidized starch provided by the present invention can be used in all manner of detergent compositions, especially those adapted for fabric laundering operations. Such detergent compositions can comprise any of the well-known detersive ingredients, including, but not limited to, detersive surfactants, builders, brighteners, bleaches, enzymes, soil release agents, perfumes, bactericides, and the like. Such materials are listed in a variety of available formulaties well-known to those practitioners of the art of formulating detergent compositions. However, for the convenience of the formulatot, and not by way of limitation, the following ingredients are listed for use in detergent compositions containing the oxidized starch of the present invention.

Detersive Surfactant—The detersive surfactants which can be used in the detergent compositions of the present invention include any of the soap and nonsoap surfactants. Such surfactants include, for example, common alkali, ammonium and alkanolammonium $C_{12}$–$C_{18}$ soaps; $C_{10}$–$C_{20}$ alkylbenzene sulfonates; $C_{10}$–$C_{20}$ alkyl sulfates; $C_{10}$–$C_{20}$ alkylethoxy sulfates; paraffin sulfonates; $C_{10}$–$C_{20}$ betaines; $C_{10}$–$C_{20}$ sulfaines; α-sulfonated fatty acids in the $C_{10}$–$C_{20}$ range, especially the methyl through hexyl esters thereof; and any of the other anionic surfactants such as those listed in a standard text such as McCutcheons Index. Nonionic surfactants useful herein include, for example, the $C_{10}$–$C_{20}$ alkylphenyl ethoxylates having from about 3 to about 15 ethoxyl units; the $C_{10}$–$C_{20}$ alcohols ethoxylated with, typically, from about 3 to about 15 moles of ethylene oxide; and the $C_{10}$–$C_{20}$ alkyl dimethyl amine oxides. Various cationic surfactants, especially the $C_{12}$–$C_{20}$ alkyl trimethyl ammonium surfactants can also be employed herein. As is well known, mixtures of such surfactants can also be employed. Detergent compositions will generally contain from about 3% to about 30%, more typically from about 5% to about 20%, by weight of the foregoing surfactants, or mixtures thereof.

It may be of advantage to the formulatot to prepare surfactant mixtures which contain ingredients which are available from renewable resources. Soap is, of course, one such type of surfactant. The α-sulfonated fatty acid esters, noted above, are also available mainly from renewable resources. The polyhydroxy fatty acid amides, such as the $C_{12}$–$C_{20}$ fatty acid amides of N-methylglucamine constitute a preferred class of nonionic surfactants which are available mainly from renewable resources and which, therefore, may be preferred by the formulatot. Such surfactants may be used in the amounts as noted hereinabove.

Detergency Builders—As with the case of detersive surfactants, a wide variety of non-starch-derived detergency builders is available to the formulator. Phosphate builders such as the sodium phosphates and pyrophosphates can be used in conjunction with the oxidized starches herein. Oxidized starch can serve as an inhibitor of calcium pyrophosphate precipitation. However, it is generally becoming more accepted to use nonphosphate builders to replace the traditional phosphate builders. Typically, such nonphosphate builders will fall within the class known as polycarboxylate builders. Included among such builders for use herein are: citric acid; nitrilotriacetic acid; oxydisuccinic acid; the tartrate mono- and di-succinates; alkyl and alkenyl ($C_{10}$–$C_{18}$) succinates; and the like are all well-known polycarboxylate builders, although it will be appreciated that any of the polycarboxylate builders can be used herein. Typically, such builders will comprise from about 5% to about 40%, more preferably from about 8% to about 20% by weight of a fully-formulated laundry detergent composition. Of course, the amounts used can vary depending on the desires of the formulator and the water hardness that is encountered by the user.

Another type of builder useful herein is the well-known zeolite builders, particularly the hydrated Zeolite A builder in the 1–10, preferably 1–5 micron particle size range. Such zeolite-type builders have become well-known to detergent formulatots worldwide. Typical granular laundry detergents will contain from about 8% to about 40%, more typically from about 10% to about 25%, by weight of zeolite builders.

The layered silicate builders are also useful herein and are usually employed in a manner and in amounts typical for the zeolite builders. Layered silicate builders suitable for use in laundry detergents, especially granules, are described in U.S. Pat. No. 4,664,859 issued May 12, 1987. A suitable layered silicate builder is available as SKS-6, from Hoechst.

Zeolite builders and layered silicate builders can advantageously be used in conjunction with other builder materials, especially polycarboxylate builders, in full-formulated heavy duty laundry detergents. Typically, the weight ratio of zeolite: auxiliary builder will be in the ratio of from about 1:5 to about 5:1, more typically from about 2:1 to about 1:2.

Detersive Adjuncts—It is to be understood that a reasonably acceptable laundry detergent composition will mainly comprise detersive surfactant and builder. However, a wide variety of detergency adjuncts are typically employed in modern, fully-formulated laundry detergents in order to improve soil removal performance. This is particularly true when the formulator is attempting to provide compositions which will address the consumer needs for products which will remove a wide variety of soil types from a wide variety of fabrics under circumstances which range from cold water through hot water wash conditions. Accordingly, ingredients such as bleaches, including standard perborate, percarbonate, persulfate, and the like, can be included in the compositions. Likewise, optical bleaches such as the well-known and commercially available phthalocyanine bleaches can be employed. Various enzymes, including proteases, amylases, lipases, cellulases, peroxidases, and the like, and mixtures thereof, can be included in detergent compositions. Various ingredients designed to add perfume or other aesthetic qualities to the fabrics can be employed. Bleach activators, such as the tetraacetylethylenediamines, the nonoyloxybenzene sulfonates, the nonyl amide of peroxysuccinic acid, and the nonyl amide of peroxyadipic acid can be used. The relative proportions of such detergency adjuncts will, of course, come within the purview of the formulator, depending on the type of detergent composition that is being prepared. It will be appreciated that the foregoing represents non-limiting illustrations of various detersive adjuncts useful herein. Typically, however, the detergency adjuncts will comprise from about 1% to about 25% by weight of the finished composition.

EXAMPLE IV A and B

A granular laundry detergent according to this invention is as follows.

| Ingredient | Percent (wt.) A | B |
|---|---|---|
| $C_{14}$—$C_{15}$ alkyl sulfate, Na salt | 17.5 | 5.5 |
| $C_{12.3}$ alkyl benzene sulfonate | — | 12.9 |
| Zeolite A (1–10µ; hydrated) | 18.0 | 26.3 |
| Sodium citrate | — | 3.0 |
| Sodium carbonate | 19.5 | 21.1 |
| Sodium silicate (2.0 r) | 6.0 | 2.2 |
| Sodium sulfate | 13.0 | 10.0 |
| Polyethyleneglycol (MW 8000) | 2.1 | 1.7 |
| Oxidized starch (per Example I) | 12.0 | 3.4 |
| Residual moisture | Balance | |

EXAMPLE V A and B

Laundry detergent base granules comprising a polyhydroxy fatty acid amide surfactant are as follows.

| Ingredient | Percent (wt.) A | B |
|---|---|---|
| $C_{12}$-$C_{14}$ N-methylglucamide | 4.3 | — |
| $C_{16}$-$C_{18}$ N-methylglucamide | — | 3.5 |
| Tallowalkyl sulfate, Na salt | — | 2.4 |
| $C_{14-15}$ alkylsulfate | 12.8 | 3.0 |
| Zeolite A (1–10µ; hydrated) | 26.7 | 15.0 |
| SKS-6 layered silicate | 6.7 | 11.0 |
| $C_{12-15}$ alkyl ethoxy (3.0) sulfate | — | 1.5 |
| $C_{14-15}$ alkyl ethoxy (2.25) sulfate | 4.3 | — |
| Oxidized starch (per Example I) | 3.0 | 3.0 |
| Citric acid | 6.7 | 3.0 |
| Sodium carbonate | 15.0 | 6.0 |
| Polyethyleneglycol (MW 8000) | 1.7 | — |
| $C_{12-15}$ alkyl ethoxylate (3) | — | 3.0 |
| Sodium silicate (2.0 r) | 2.0 | — |
| Tetraacetylethylenediamine | — | 5.0 |
| Diethylenetriamine N,N,N',N'',N''-penta(methanephosphonic acid) | — | 0.38 |
| Sodium percarbonate | — | 19.0 |
| Water and minors | Balance | |

According to the desires of the formulator, the granules of Example IV and V can be dry-mixed with optional ingredients such as detersive enzymes (e.g., protease, lipase, amylase, peroxidase, cellulase) and/or bleaches (e.g., sodium perborate, sodium percarbonate or sodium persulfate), bleach activators, soil release polymers, and the like, to provide the additional laundering benefits associated with the use of such ingredients.

EXAMPLE VI

A phosphate laundry granule formulation in which OXST functions as an inhibitor of calcium pyrophosphate precipitation is as follows.

| | Percent (wt.) |
|---|---|
| $C_{12.3}$ alkyl benzene sulfonate | 7.86 |
| $C_{14-15}$ alkylsulfate | 3.9 |
| Tallowalkylsulfate | 3.9 |
| Sodium carbonate | 11.44 |
| Sodium tripolyphosphate | 5.20 |
| Sodium pyrophosphate | 20.83 |
| Oxidized starch (per Example I) | 1.09 |
| Silicate, 1.6 r | 5.30 |
| NEODOL 23-6.5T* | 0.50 |
| Polyethylene glycol (MW 8000) | 0.44 |
| Sodium sulfate | 35.74 |
| $H_2O$ | Balance |
| TOTAL | 100.00 |

*Nonionic surfactant; average $C_{12-C13}$ alcohol with 6.5 average ethoxylation; "T" designation indicates removal of unethoxylated and monoethoxylated alcohol.

EXAMPLES VII A, B and C

The following formulations illustrate heavy duty liquid laundry detergents according to this invention.

| Ingredients | Percent (Wt.) A | B | C |
|---|---|---|---|
| $C_{12}$-$C_{14}$ fatty acid amide of N-methylglucamine | 7.0 | — | 10.0 |
| $C_{14-15}$ alkyl ethoxy (2.25) sulfate | 21.0 | 8.4 | 14.0 |
| NEODOL 23-6.5 T | — | 3.3 | — |
| NEODOL 45-7 | — | — | 4.0 |
| $C_{12.3}$ alkyl benzene sulfonate | — | 8.4 | — |
| Dodecenyl succinate, Na | — | — | 4.0 |
| Citrate, Na | 3.8 | 3.3 | 3.8 |
| TMS/TDS (80/20)* | 4.0 | 3.3 | — |
| $C_{12-14}$ fatty acid | 3.0 | 0.5 | 2.9 |
| Oxidized starch (OXST) | 2.5** | 2.5*** | 2.0** |
| Silicone oil (suds suppressor) | 0.05 | 0.04 | 0.03 |
| Miscellaneous (enzymes, brighteners, release agents, stabilizers, solvents, etc.) | 23.0 | 14.0 | 14.0 |
| Water | Balance | Balance | Balance |

*TMS/TDS is tartrate monosuccinate/tartrate disuccinate.
**Oxidized starch per Example I herein.
***Oxidized starch per Example II herein.

As noted above, the OXST materials herein are capable of performing a detergency builder function, by virtue of their multiple carboxyl units. Examples VII A and C illustrate a laundry detergent composition which advantageously employs not only the oxidized starch builder, which is available from natural, renewable resources, but also contains a polyhydroxy fatty acid amide surfactant, which is also available from renewable fat (fatty acid) and sugar resources.

EXAMPLE VIII

A detergent composition suitable for use in an automatic dishwasher is as follows.

| Ingredient | Percent (wt.) |
| --- | --- |
| Sodium tripolyphosphate | 40.0 |
| Sodium sulfate | 20.0 |
| OXST (per EXAMPLE I) | 5.0 |
| Sodium carbonate | 10.0 |
| Hydrous silicate | 15.0 |
| Surfactant* | 2.0 |
| Chlorinated sodium tripolyphosphate | 5.0 |
| Moistures and minors | Balance |

*Monostearyl acid phosphate (low sudsing).

EXAMPLE IX

A phosphate-free automatic dishwashing composition is as follows.

| Ingredient | Percent (wt.) |
| --- | --- |
| Sodium citrate | 10.0 |
| Sodium carbonate | 20.0 |
| Hydrous silicate (2.0 r) | 20.0 |
| OXST (per EXAMPLE I) | 8.0 |
| DTPA* | 0.7 |
| Sodium sulfate | 29.0 |
| Surfactant** | 1.5 |
| Sodium perborate monohydrate | 10.0 |
| Water and minors | Balance |

*Diethylenetriaminepentaacetate.
**PLURONIC nonionic surfactant; BASF-Wyandotte.

The foregoing Examples illustrate, but are not intended to limit, the practice of this invention. It will be understood by those skilled in chemical manufacturing processes that various scale-up procedures and equipment may be utilized for large-scale manufacture of the oxidized starch. For example, due to viscosity changes that occur during the course of the reaction, appropriate commercially-available mixing equipment should be used. $NO_2$ gas should be recycled or otherwise eliminated using available technologies. Likewise, technology is available to re-cycle $H_2SO_4$ and ethanol used in the process. Catalyst recovery and/or supported catalysts can be employed. Such matters are within the purview of widely-known chemical engineering procedures.

What is claimed is:

1. A method for oxidizing starch in the C6/C2–C3 positions, comprising:
    (a) dispersing starch in strong aqueous sulfuric acid,
    (b) oxidizing the starch of Step (a) with nitric acid in the presence of sulfuric acid with a vanadium catalyst and a catalytic amount of $NO_2$ to secure at least 60 mole percent oxidation at the C6 position;
    (c) precipitating the oxidized starch from Step (b) away from the sulfuric acid;
    (d) neutralizing the oxidized starch with base; and
    (e) reducing residual ketones in the oxidized starch.

2. A method according to claim 1, comprising:
    Step 1: preparing a starch dispersion comprising from about 25% to about 45% wt. starch in aqueous sulfuric acid, said sulfuric acid being in the concentration range of from about 65% to about 85% wt., said dispersion step being carried out at a temperature from about 10° C. to about 25° C.;
    Step 2: oxidizing the starch dispersion from Step 1 with nitric acid in the presence of $NO_2$ ion and a vanadium catalyst under the following conditions:
        (a) the oxidation temperature is from about 20° C. to about 40° C.;
        (b) the starch comprises from about 20% to about 30% by weight of the reaction mixture of Step 2;
        (c) the weight percentage of nitric acid comprises from about 0.75 to about 1.3 times the weight percentage of starch in the reaction mixture;
        (d) the weight percentage of nitrite comprises from about 0.004 to about 0.05 times the weight percentage of starch;
        (e) the weight percentage vanadium catalyst comprises from about 0.0004 to about 0.004 times the weight percentage of starch; and
        (f) the balance of the reaction mixture of Step 2 comprises aqueous sulfuric acid, at a concentration from about 50% to about 70% by weight.

* * * * *